US012042449B2

(12) United States Patent
Kludt

(10) Patent No.: US 12,042,449 B2
(45) Date of Patent: *Jul. 23, 2024

(54) PATIENT POSITIONING DEVICE

(71) Applicant: Nathan A. Kludt, Stockton, CA (US)

(72) Inventor: Nathan A. Kludt, Stockton, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 17/450,676

(22) Filed: Oct. 12, 2021

(65) Prior Publication Data

US 2022/0313512 A1 Oct. 6, 2022

Related U.S. Application Data

(63) Continuation of application No. 17/301,496, filed on Apr. 5, 2021, now Pat. No. 11,147,723.

(51) Int. Cl.
*A61G 7/00* (2006.01)
*A41B 13/06* (2006.01)
*A61G 7/10* (2006.01)

(52) U.S. Cl.
CPC ........... *A61G 7/001* (2013.01); *A61G 7/1038* (2013.01); *A41B 13/06* (2013.01); *A61G 7/1026* (2013.01); *A61G 7/1032* (2013.01); *A61G 2200/325* (2013.01)

(58) Field of Classification Search
USPC .......................................... 224/158; 5/81.1 T
See application file for complete search history.

(56) References Cited

U.S. PATENT DOCUMENTS 2,835,902 A 5/1955 Fash
3,540,441 A 11/1970 Collins
4,005,498 A * 2/1977 Starr .................... A61G 7/1009 5/81.1 R
4,817,836 A 4/1989 Bates
4,908,889 A 3/1990 Lonardo
5,148,558 A 9/1992 Dunn
5,329,655 A 7/1994 Garner
5,333,335 A 8/1994 Gastle et al.
5,449,004 A 9/1995 Sanchez, Jr.
5,787,523 A 8/1998 Lindberg
5,924,612 A 7/1999 Boedeker
(Continued)

FOREIGN PATENT DOCUMENTS

JP 2010-515475 A 5/2010
WO WO 2011/064796 A1 6/2011
WO WO 2020/089604 A1 5/2020

OTHER PUBLICATIONS

International Search Report in PCT/US2022/019785 dated Jun. 22, 2022.
Written Opinion in PCT/US2022/019785 dated Jun. 22, 2022.

*Primary Examiner* — Adam C Ortiz
(74) *Attorney, Agent, or Firm* — KNOBBE, MARTENS, OLSON & BEAR, LLP

(57) ABSTRACT

A patient positioning device facilitates the placement of a patient in the prone position on the bolsters of a medical table or bed more quickly. The patient positioning device facilitates the surgeon's removal of their arms from underneath the patient once the patient has been properly positioned in the prone position on the medical table or bed (e.g., without shifting the patient out of place). Additionally, the patient positioning device inhibits (e.g., prevents) the surgeon's arms from coming into contact with the patient's skin.

19 Claims, 8 Drawing Sheets

(56) References Cited

U.S. PATENT DOCUMENTS

| | | | |
|---|---|---|---|
| 5,933,884 | A | 8/1999 | Shikinami et al. |
| 6,349,432 | B1 | 2/2002 | Scordato et al. |
| 9,504,621 | B2 | 11/2016 | Purdy et al. |
| 9,782,313 | B2 | 10/2017 | Hindson |
| 10,576,004 | B1 | 3/2020 | Frances |
| 11,147,723 | B1 | 10/2021 | Kludt |
| 2012/0186587 | A1 | 7/2012 | Steffens et al. |
| 2018/0193213 | A1 | 7/2018 | Spahn et al. |

* cited by examiner

PATIENT POSITIONING DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to a medical device, and more particularly to a patient positioning device for facilitating the placement of a patient in a prone position, such as in an operating room.

Description of the Related Art

Positioning a patient prone in the operating room can be a stressful and frustrating experience. Patients are placed on two bolsters that run from their clavicle to anterior superior iliac spine. This involves the entire medical team moving the anesthetized patient from the supine (face-up) position on the gurney to a prone (face-down) position on the bolsters in a coordinated movement. The anesthesiologist protects the head, neck and airway. The circulating nurse pushes the patient's body over, while the scrub will manage the lower extremities during the rotation. The surgeon or "catcher" will catch the patient and position them on the bolsters. Frequently the surgeon will get their arms caught under the patient, leading to a struggle that can shift a patient out of position, which can delay the proper positioning of the patient prior to surgery. While moving the patient, all team members protect themselves with gloves, but the surgeon catching the patient will come into contact with the patient's skin. Since most of the focus is on getting the patient safely into the prone position, this exposure is almost universal.

SUMMARY

In accordance with one aspect of the disclosure, a patient positioning device is provide that addresses one or more of the deficiencies in the current procedure of placing a patient safely in a prone position in an operating room. The patient positioning device facilitates the placement of the patient in the prone position on the bolsters of the operating table efficiently and more quickly. Such reduction of time in properly placing the patent can be advantageous, such as in emergency room procedures, where time is of the essence in providing treatment.

In accordance with one aspect of the disclosure, a patient positioning device is provided that facilitates the surgeon in catching and positioning the patient in a prone position on the bolsters of the operating table. Advantageously, the patient positioning device facilitates the surgeon's removal of their arms from underneath the patient once the patient has been properly positioned on the operating table (e.g., without shifting the patient out of place). Additionally, the patient positioning device inhibits (e.g., prevents) the surgeon's arms from coming into contact with the patient's skin.

In accordance with one aspect of the disclosure, a patient positioning device is provided that facilitates the patient's positioning on the operating table once the surgeon's arms have been removed from underneath the patient. The patient positioning device remains under the patient once he or she has been positioned in the prone position. The patient positioning device can have a non-slip bottom surface that inhibits (e.g., prevents) the patient from shifting out of the prone position that he or she has been placed in by the surgeon.

In accordance with one aspect of the disclosure, a patient positioning device is provided that has an absorbent portion. The patient positioning device remains under the patient once he or she has been positioned in the prone position, with the absorbent portion adjacent (e.g., in contact with) the patient's skin. The absorbent portion absorbs moisture (e.g., bodily or surgical fluids) from the patient and inhibits (e.g., prevents) the patient from shifting (e.g., slipping, sliding) relative to the prone positioning device that he or she has been placed in by the surgeon.

In accordance with another aspect of the disclosure, a device for positioning a patient in a prone position on a medical bed or table is provided. The device comprises an outer sleeve having a length greater than a width, a top surface comprising an absorbent material configured to absorb moisture from the patient when the patient is placed thereon, and a bottom surface comprising a non-slip texture or material. The outer sleeve comprises a cavity between the top surface and the bottom surface and extending between an opening at one end of the length of the outer sleeve and a closed end at an opposite end of the length of the outer sleeve. The cavity is defined at least in part by an inner upper surface and an inner bottom surface. The device also comprises an inner sleeve having a length greater than a width and removably disposed in the cavity through the opening, the inner sleeve having a sleeve length that is approximately equal to the length of the outer sleeve, the inner sleeve having an opening at one end of the sleeve length and a closed end at an opposite end of the sleeve length and defining a sleeve cavity therebetween. The sleeve cavity is configured to receive at least one arm of a user therein such that at least a hand and a forearm of said at least one arm are covered by the inner sleeve. The inner sleeve comprises a different material than a material of the outer sleeve and that facilitates removal of the inner sleeve from the cavity of the outer sleeve. The device facilitates movement of a patient from a supine position to a prone position on the top surface while facilitating the user's removal of their arms from under the patient once in the prone position via the removal of the inner sleeve from the cavity of the outer sleeve. The non-slip texture or material of the bottom surface inhibits shifting of the device and patient thereon from a medical bed or table on which the patient is placed in the prone position.

In accordance with another aspect of the disclosure, a device for positioning a patient in a prone position on a medical bed or table is provided. The device comprises an outer sleeve having a length greater than a width, a top surface comprising an absorbent material configured to absorb moisture from the patient when the patient is placed thereon, and a bottom surface comprising a non-slip texture or material. The outer sleeve comprises a cavity between the top surface and the bottom surface and extending between an opening at one end of the length of the outer sleeve and a closed end at an opposite end of the length of the outer sleeve, the cavity defined at least in part by an inner upper surface and an inner bottom surface. The device also comprises an inner sleeve having a length greater than a width and removably disposed in the cavity through the opening, the inner sleeve having a sleeve length that is approximately equal to the length of the outer sleeve, the inner sleeve having an opening at one end of the sleeve length and a closed end at an opposite end of the sleeve length and defining a sleeve cavity therebetween. The sleeve cavity is configured to receive both arms of a user therein such that at least a hand and a forearm of both arms are covered by the inner sleeve. The inner sleeve comprises a different material than a material of the outer sleeve and that facilitates removal of the inner sleeve from the cavity of the outer sleeve. The device facilitates movement of a patient from a supine position to a prone position on the top surface while facilitating the user's removal of their arms from under the patient once in the prone position via the removal of the inner sleeve from the cavity of the outer sleeve. The non-slip texture or material of the bottom surface inhibits shifting of the device and patient thereon from a medical bed or table on which the patient is placed in the prone position.

DETAILED DESCRIPTION

Figure 1:
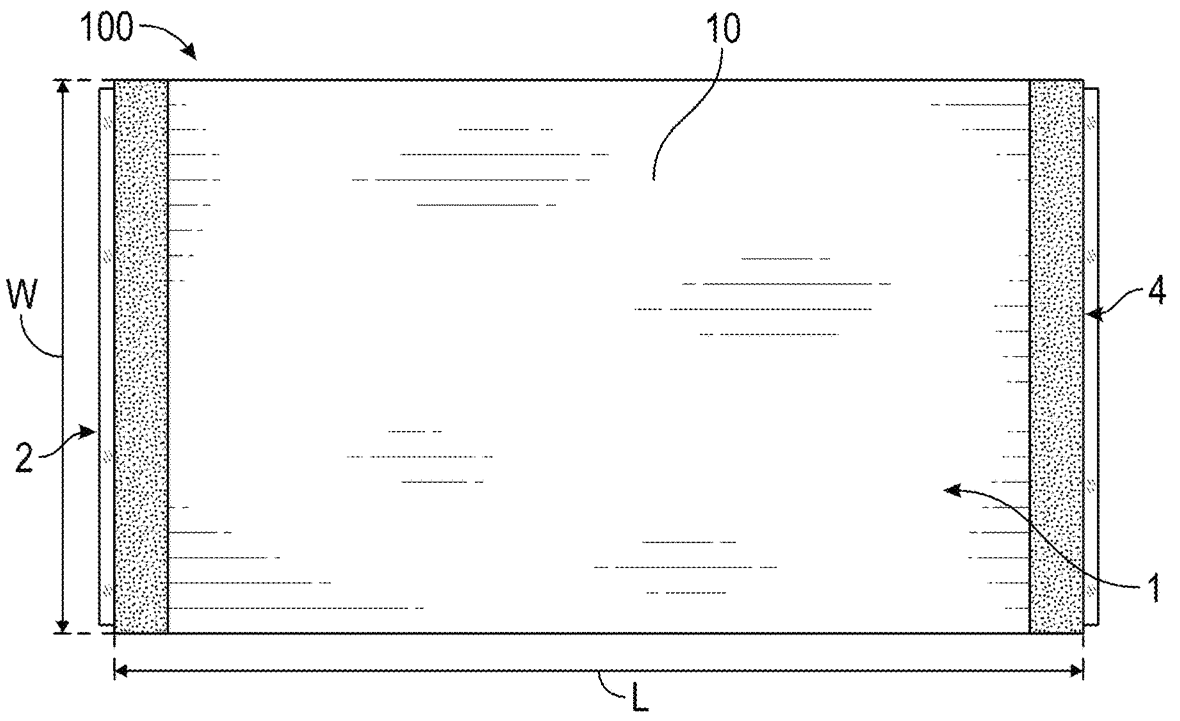
FIG. 1 is a top view of a prone positioning device.
Figure 2:
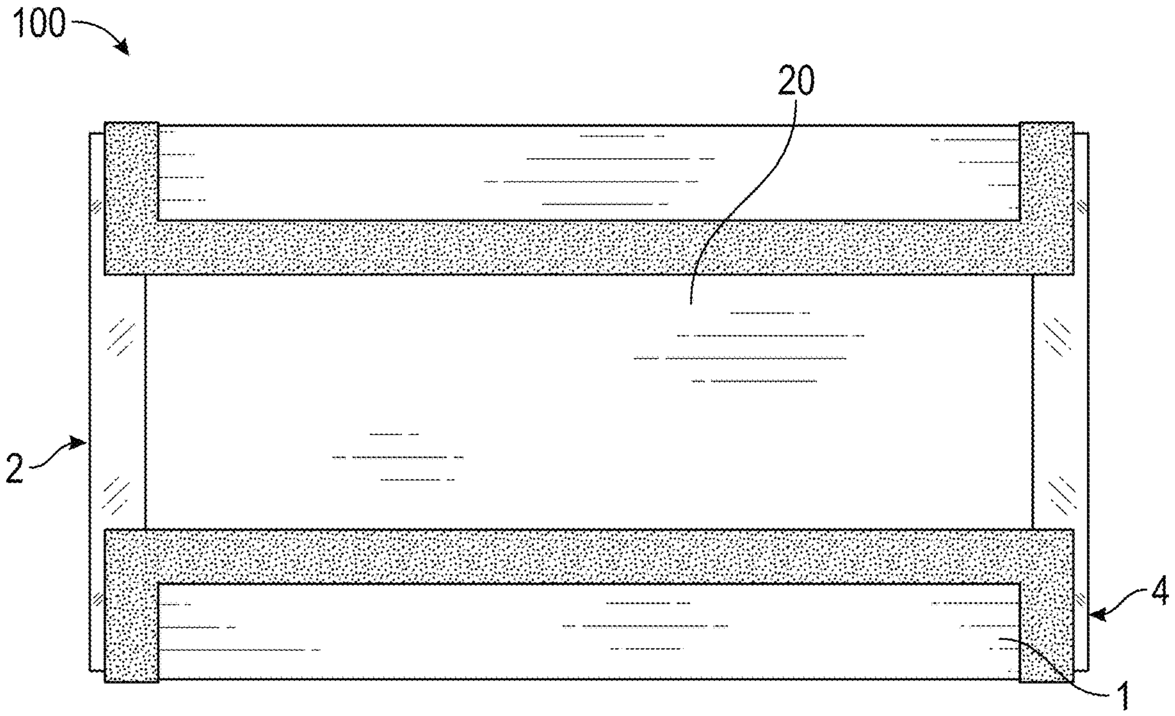
FIG. 2 is a bottom view of the prone positioning device of FIG. 1.

FIGS. 1-7 shows a patient positioning device 100 (hereafter "the positioning device") that can be utilized to facilitate positioning a patient in a prone position on a medical bed or table. For example, as further discussed below, medical professionals may want to transfer a patient who is lying in a supine (e.g., face up) position on a gurney onto a medical bed or table (e.g., surgical table) and position the patient in a prone (e.g., face down) position. This involves the entire medical team moving the anesthetized patient from the supine (face-up) position on the gurney to a prone (face-down) position on the bolsters in a coordinated movement. The anesthesiologist protects the head, neck and airway. The circulating nurse pushes the patient's body over, while the scrub will manage the lower extremities during the rotation. The surgeon or "catcher" will catch the patient and position them on the bolsters in the prone position.

The positioning device 100 has an outer sleeve 1 that extends along a length L, between a first end 2 and an opposite second end 4, and width W. In one implementation, the length L is greater than the width W. In one example, the length L can be between 24 inches and 36 inches, such as about 30 inches. In one example, the width W can be between 15 inches and 24 inches, such as about 18 inches. The outer sleeve 1 can be flexible (e.g., can be folded). In one implementation, the outer sleeve 1 can include a stretchable material. In another implementation, the outer sleeve 1 can be made of a non-stretchable material.

Figure 3:
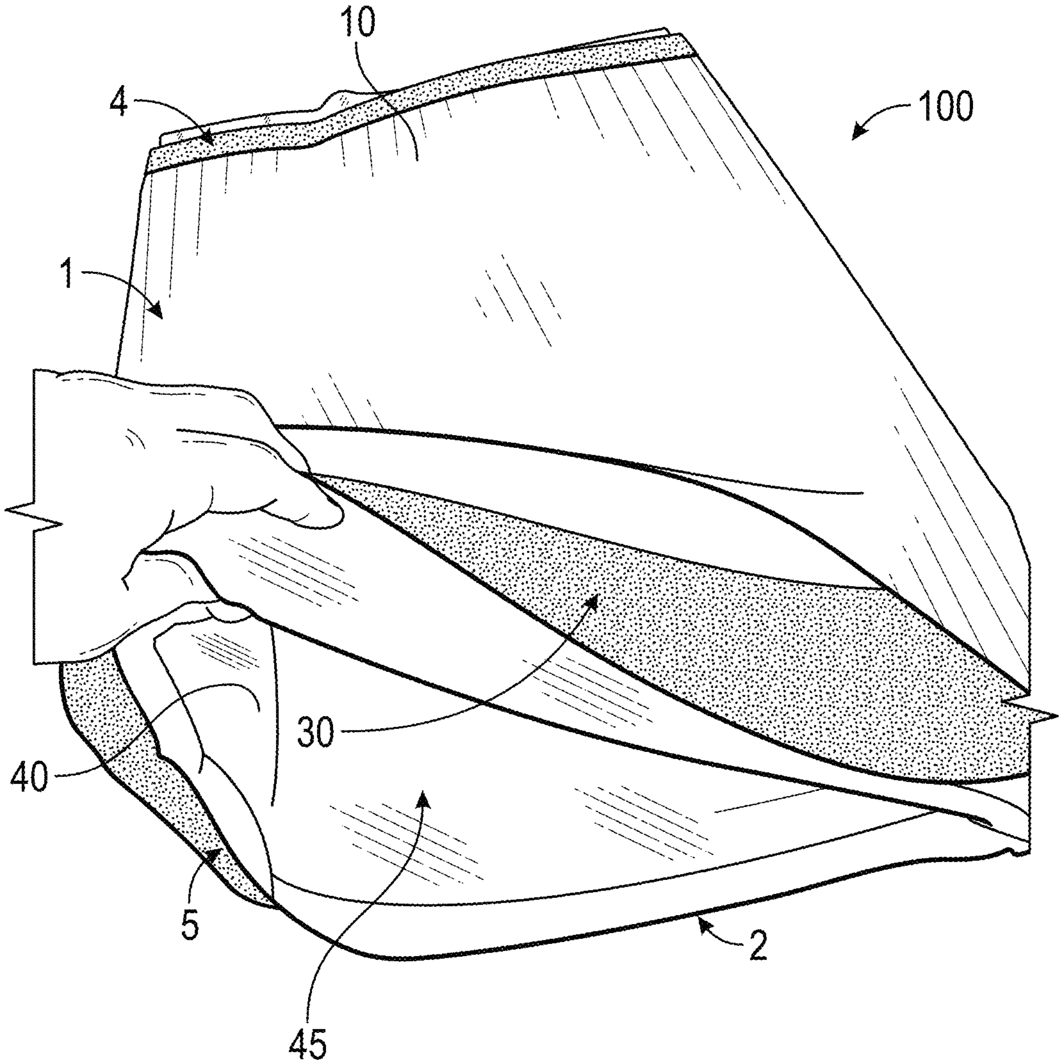
FIG. 3 is an end view of the prone positioning device of FIG. 1.
Figure 4A:
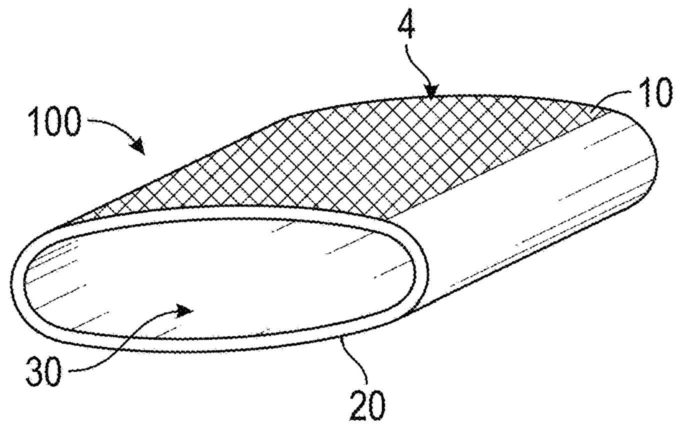
FIG. 4A is a schematic top perspective view of the prone positioning device.
Figure 4B:
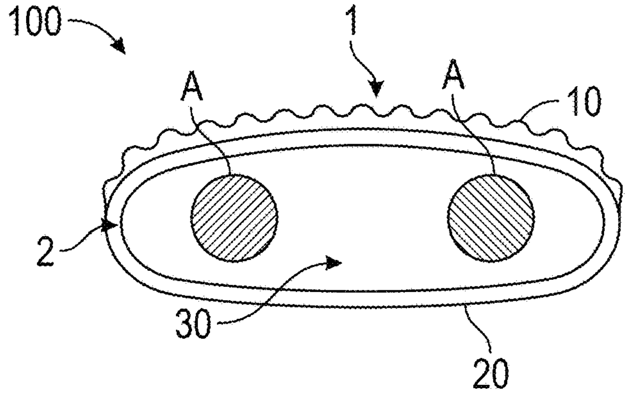
FIG. 4B is a schematic end view of the prone positioning device during use, with the surgeon's hands in the device.
Figure 5:
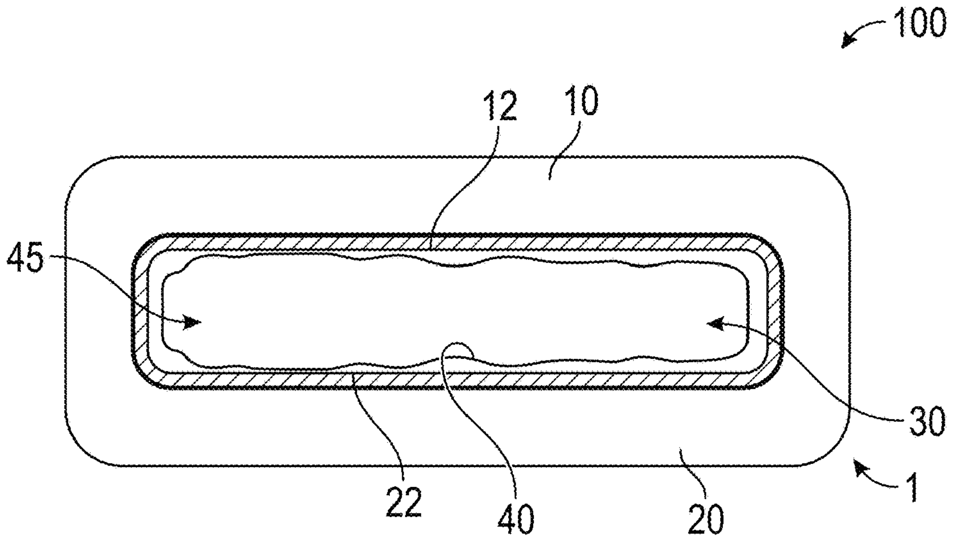
FIG. 5 is a schematic end view of the prone positioning device with the removable inner sheath or sleeve in place.

The positioning device 100 has a top portion or surface 10 and an opposite bottom portion or surface 20 that extend along the length L and width W. With reference to FIGS. 3-5, the positioning device 100 has a pocket or cavity 30 that extends from an opening 5 at the first end 2 to a closed end at the second end 4. In another implementation, the second end 4 can also have an opening (e.g., the outer sleeve 1 can be open at both ends 2, 4). In one implementation, the pocket or cavity 30 spans approximately an entirety of the length L and width W of the positioning device 100 and includes an inner upper surface 12 and an inner bottom surface 22. The pocket or cavity 30 can be a single continuous opening, cavity or pocket (e.g., without partitions) between the first end 2 and the second end 4.

The top portion or surface 10 of the outer sleeve 1 can be part of a pad (e.g., cushioned portion). In one implementation, the top portion or surface 10 can be of an absorbent material and can absorb bodily fluids (e.g. moisture) from the patient and protect the patient from pressure. For example, the top portion or surface 10 can be made of foam, a gentle adhesive (e.g., MEPILEX®, Chucks pad, absorbent foam), wax, textured rubber, and/or cotton. Additionally or alternatively, in one implementation the top portion or surface 10 can be of a non-slip material or texture (e.g., MEPILEX®, Chucks pad, absorbent foam) that inhibits (e.g., prevents) the patient from shifting (e.g. sliding) relative to the top portion or surface 10. The bottom portion or surface 20 of the outer sleeve 1 can be of a non-slip material or texture (e.g., thin foam or rubber, cotton) that inhibits (e.g., prevents) the patient from shifting (e.g. sliding) relative to the medical table or bed 60, and/or bolsters 50.

In one implementation, the outer sleeve 1 is disposable. In another implementation, the outer sleeve 1 can be reusable. In one example, one or both of the top portion or surface 10 and bottom portion or surface 20 can be removably attached to the outer sleeve 1 (e.g., via hoop-and-loop fasteners, such as VELCRO™), can be reversible and cleanable (e.g., with existing solutions used to clean medical equipment).

The positioning device 100 can include an inner sleeve 40 that is removably received in the pocket or cavity 30. The inner sleeve 40 can be made of a different material than the outer sleeve 1 that facilitates the removal of the inner sleeve 40 from the outer sleeve 1 (e.g., by reducing friction between the surfaces of the inner sleeve 40 and the inner upper surface 12 and inner bottom surface 22. For example, the inner sleeve 40 can be made of plastic. The inner sleeve 40 can be flexible. The inner sleeve 40 can have a length L2 approximately equal to (e.g., at least as long as) the length L of the outer sleeve 1. In one implementation, the inner sleeve 40 can have a width W2 approximately equal to the width W of the outer sleeve 1. The inner sleeve 40 can have a pocket or cavity 45 that extends from an open end 42 to a closed end 44. In one implementation, the length L2 of the inner sleeve 40 is sized so that the pocket or cavity 45 can receive one or both arms A (e.g., both arms A simultaneously) of a user (e.g., a surgeon, and adult) so that the inner sleeve 40 covers at least the user's hand(s) and forearm(s). In one implementation, the length L2 of the inner sleeve 40 is sized so that the inner sleeve 40 covers the user's hand(s), forearm(s) and at least a portion of the user's upper arm(s). In one implementation, the width W2 of the inner sleeve 40 is such that the user can hold their arms within the pocket or cavity 45 at approximately shoulder width apart to allow the user (e.g., surgeon) to securely and stably catch the patient (e.g., the torso of the patient) as they are pivoted from the supine position to the prone position. In another implementation, the inner sleeve 40 can be a pair of separate sleeves, one for each of the user's arms, each having a width smaller than the width W of the pocket or cavity 30.

Figure 6:
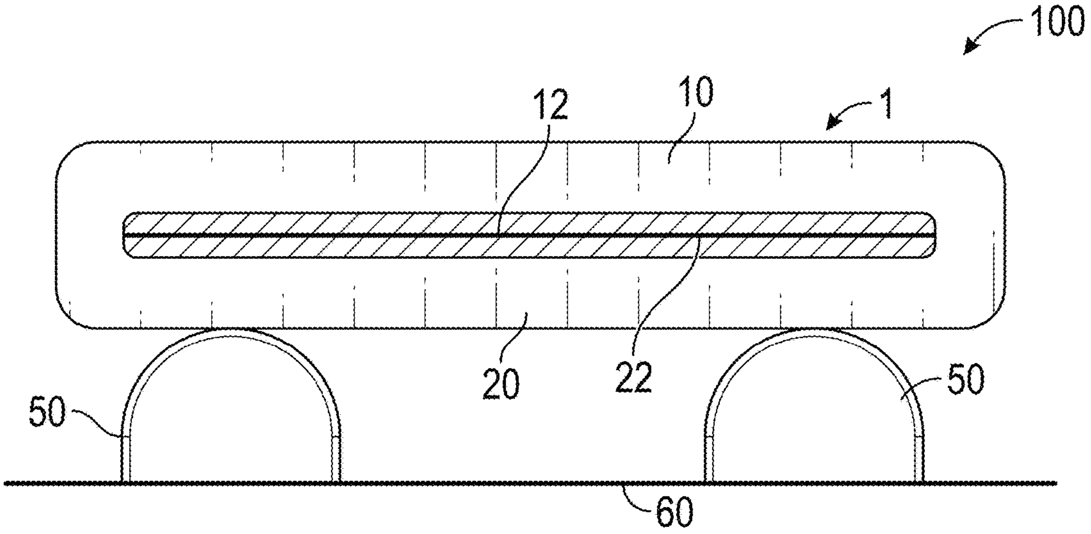
FIG. 6 is a schematic end view of the prone positioning device once the inner sheath or sleave has been removed.
Figure 7:
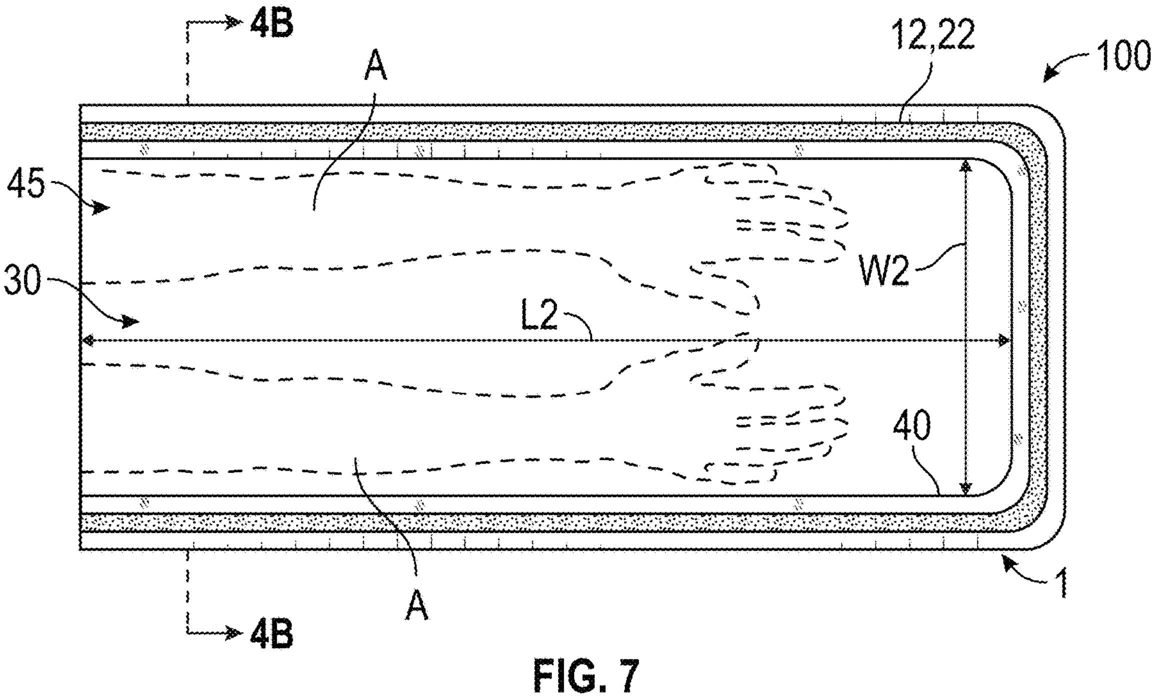
FIG. 7 is a schematic cross-sectional view of the prone positioning device with the inner sheath or sleeve in place and the surgeon's arms in the device, taken along line 7-7 in FIG. 4B.

With reference to FIG. 6, once the inner sleeve 40 is removed from the pocket or cavity 30, the inner upper surface 12 will contact the inner bottom surface 22 (e.g., under the weight of the patient on the top portion or surface 10 of the positioning device 100. In one implementation, inner upper surface 12 and inner bottom surface 22 can include a pressure activated adhesive material, such that the inner upper surface 12 can adhere to the inner bottom surface 22 when the contact each other (e.g., under the weight of the patient following removal of the inner sleeve 40), such that the bottom portion or surface 20 and top portion or surface 10 become a single body and so as to inhibit motion (e.g., shifting, slipping) of the top portion or surface 10 relative to the bottom portion or surface 20.

Figure 8:
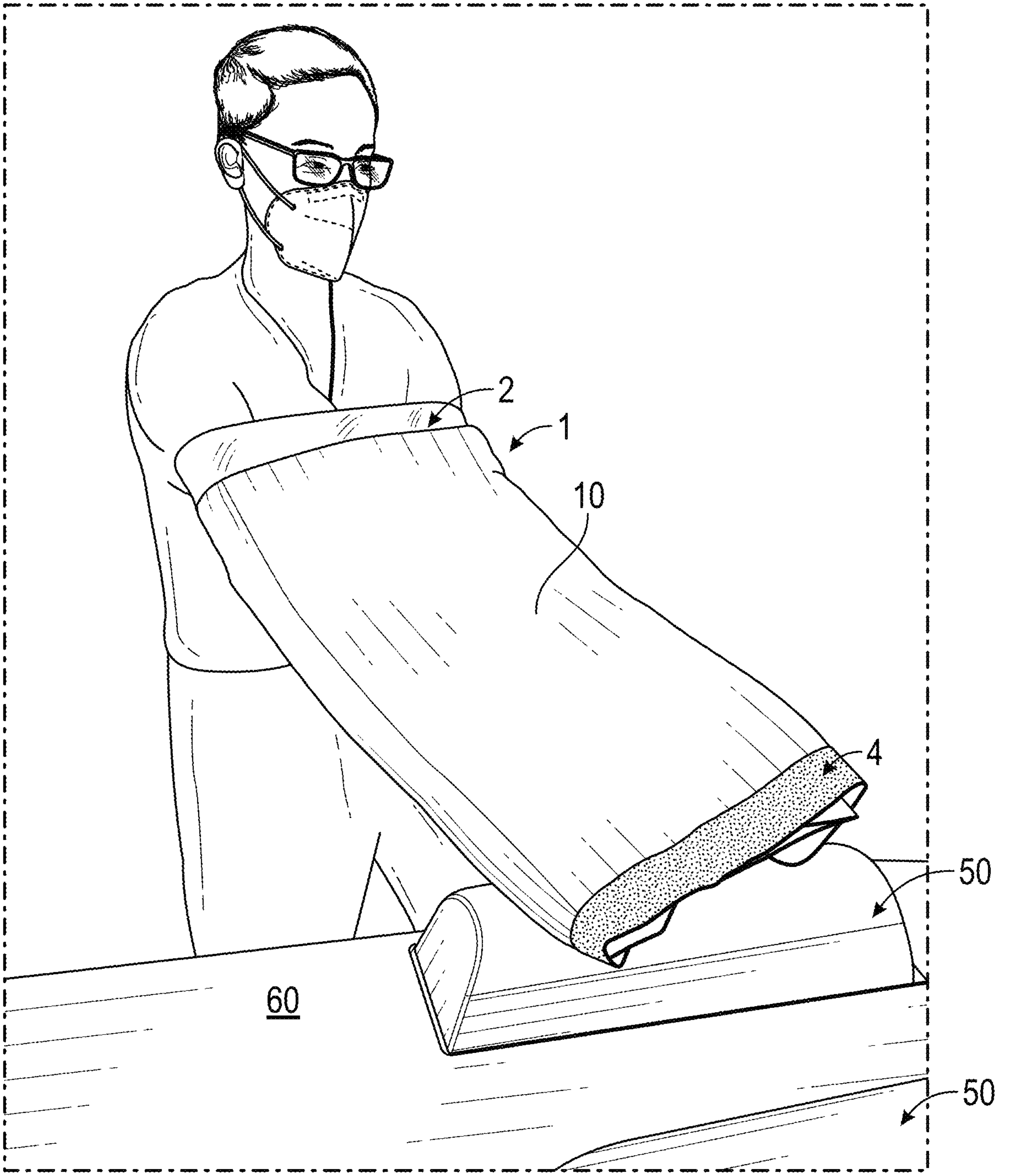
FIG. 8 shows the patient positioning device worn by the surgeon in one step during use of the device prior to the patient being moved from a supine to a prone position.

FIGS. 8-11 show the positioning device 100 in use. FIG. 8 shows the surgeon with both his arms A inserted into the inner sleeve 40, and the inner sleeve 40 disposed in the outer sleeve 1. The outer sleeve 1 covers the surgeon's hands, forearms and at least a portion of his upper arms so that when the surgeon catches the patient as they are turned from the supine to the prone position the surgeon's arms do not contact the patient's skin or their bodily fluids.

Figure 9:
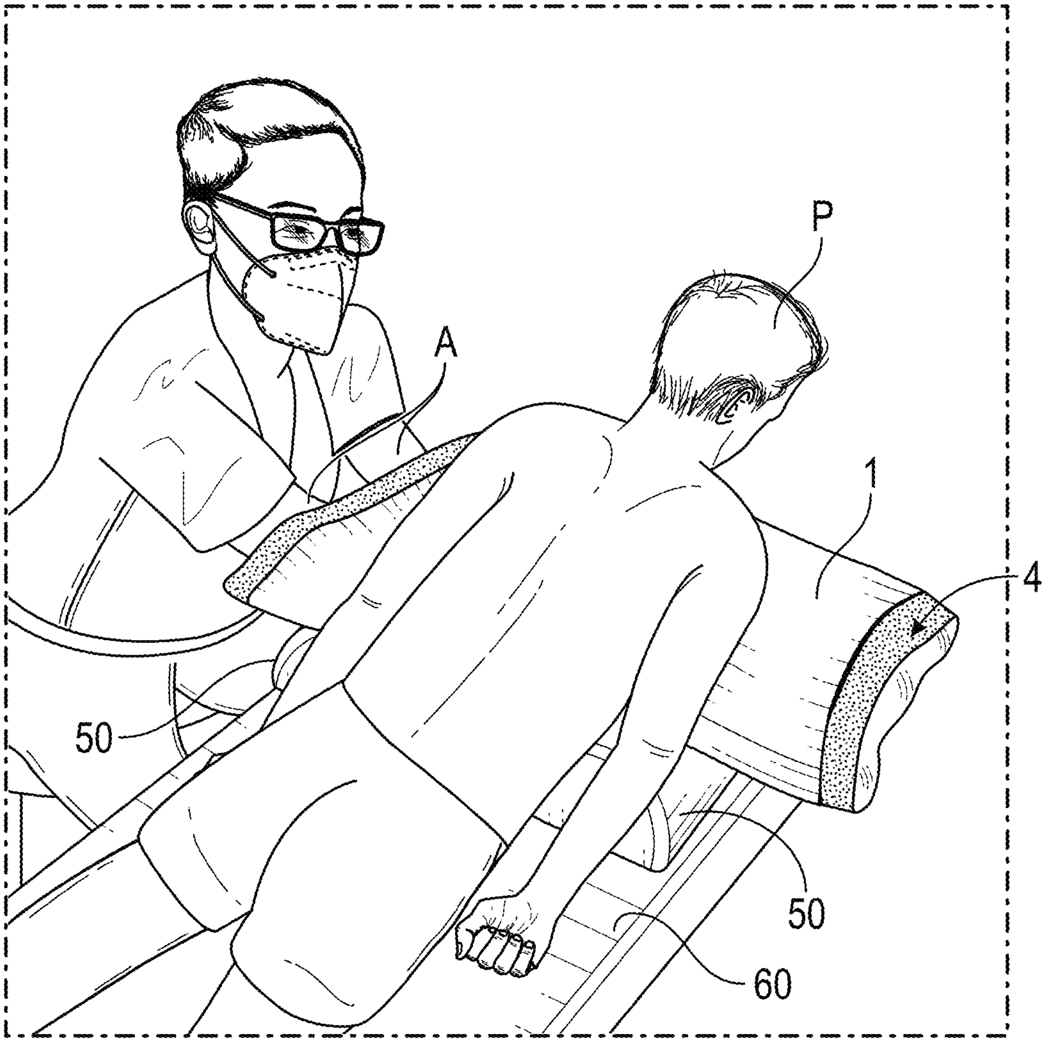
FIG. 9 shows the patient positioning device disposed under a patient once the patient has been rotated onto a prone position on the operating table.
Figure 10:
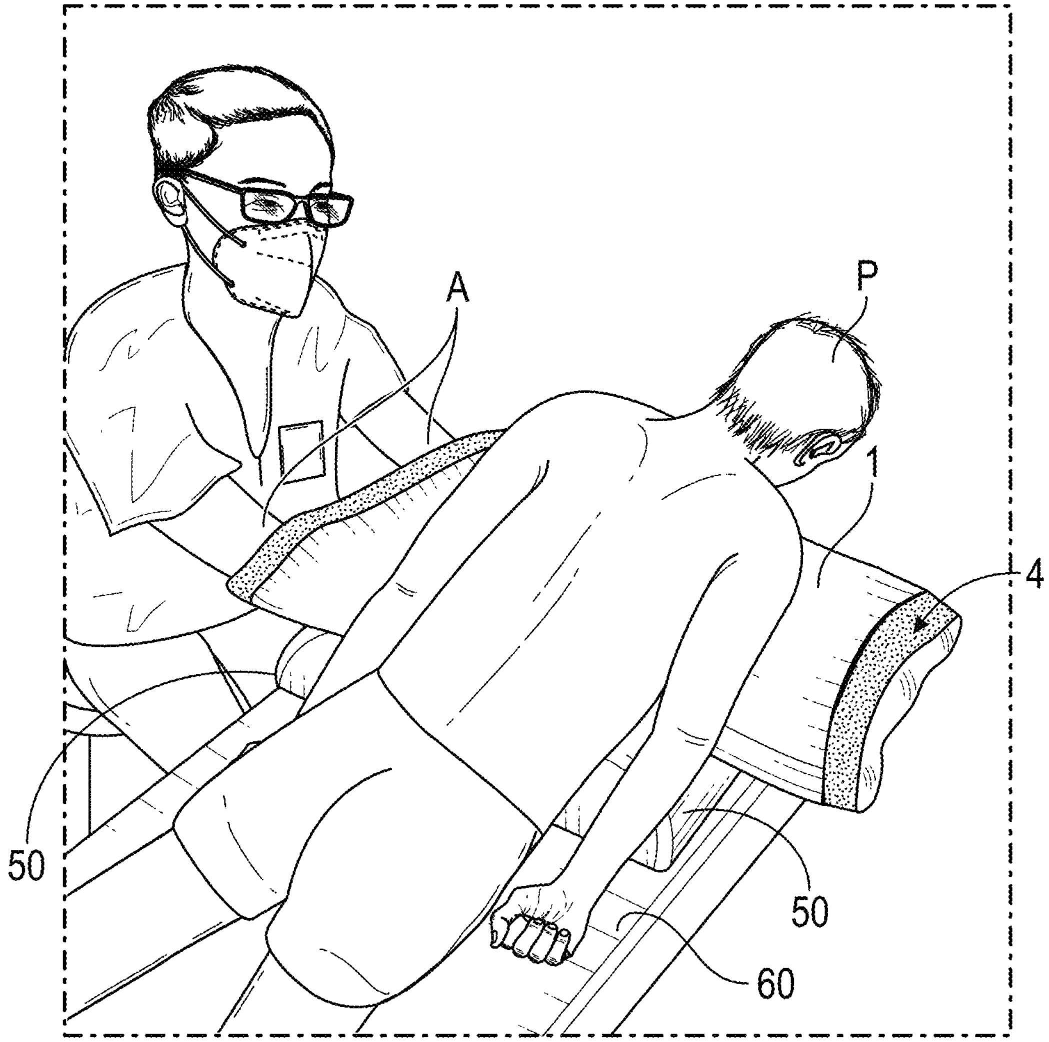
FIG. 10 is another view of the patient positioning device disposed under a patient once the patient has been rotated onto a prone position on the operating table.

FIGS. 9-10 shows the surgeon with their arms A in the positioning device 100, as described above, after catching the patient (e.g., the torso of the patient) rotated to the prone position. The surgeon can guide the patient (e.g., torso of the patient) onto the bolsters 50 on the medical table or bed 50 to properly position the patient in the prone position on the medical table or bed 50.

Figure 11:
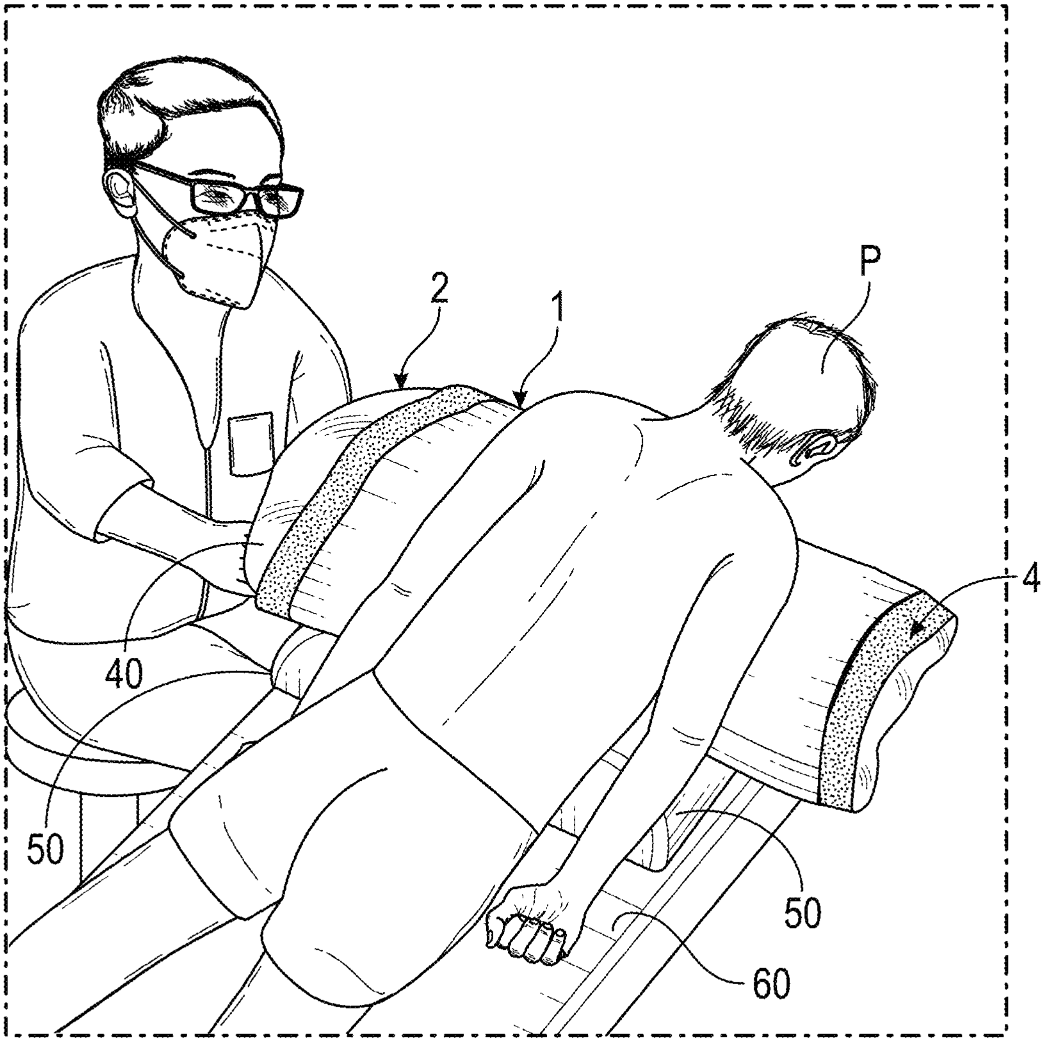
FIG. 11 shows the surgeon removing his arms along with the inner sheath or sleeve from within the prone positioning device and from under the patient, leaving the patient in the desired prone position.

FIG. 11 shows the surgeon removing their arms (with the inner sleeve 40) from within the outer sleeve 1 of the positioning device 100. The patient P remains on the positioning device 100, which remains on the bolsters 50 and medical bed or table 50.

ADDITIONAL EMBODIMENTS

In embodiments of the present disclosure, a patient positioning device may be in accordance with any of the following clauses:

Clause 1. A device for positioning a patient in a prone position on a medical bed or table, comprising:

an outer sleeve having a length greater than a width,
- a top surface comprising an absorbent material configured to absorb moisture from the patient when the patient is placed thereon,
- a bottom surface comprising a non-slip texture or material, and
- a cavity between the top surface and the bottom surface and extending between an opening at one end of the length of the outer sleeve and a closed end at an opposite end of the length of the outer sleeve, the cavity defined at least in part by an inner upper surface and an inner bottom surface; and an inner sleeve having a length greater than a width and removably disposed in the cavity through the opening, the inner sleeve having a sleeve length that is approximately equal to the length of the outer sleeve, the inner sleeve having an opening at one end of the sleeve length and a closed end at an opposite end of the sleeve length and defining a sleeve cavity therebetween, the sleeve cavity configured to receive at least one arm of a user therein such that at least a hand and a forearm of said at least one arm are covered by the inner sleeve, the inner sleeve comprising a different material than a material of the outer sleeve and that facilitates removal of the inner sleeve from the cavity of the outer sleeve, wherein the device facilitates movement of a patient from a supine position to a prone position on the top surface while facilitating the user's removal of their arms from under the patient once in the prone position via the removal of the inner sleeve from the cavity of the outer sleeve, and wherein the non-slip texture or material of the bottom surface inhibits shifting of the device and patient thereon from a medical bed or table on which the patient is placed in the prone position.

Clause 2. The device of clause 1, wherein the top surface is part of an absorbent pad of the outer sleeve.

Clause 3. The device of any preceding clause, wherein the inner upper surface and inner bottom surface are configured to contact when the inner sleeve is removed from the cavity.

Clause 4. The device of any preceding clause, wherein the inner upper surface and inner bottom surface are configured to frictionally engage when the inner sleeve is removed from the cavity.

Clause 5. The device of any preceding clause, wherein the inner upper surface and inner bottom surface of the cavity are configured to adhere to each other when the inner sleeve are removed from the cavity.

Clause 6. The device of any preceding clause, wherein the top surface comprises a non-slip texture or material.

Clause 7. The device of clause 6, wherein the non-slip texture or material is chosen from a group consisting of: foam, an adhesive material, wax, a textured rubber and cotton.

Clause 8. The device of any preceding clause, wherein the opening of the inner sleeve is a single opening and the sleeve cavity is a single continuous cavity sized to receive both hands and arms of the user therein.

Clause 9. The device of any preceding clause, wherein the outer sleeve has a length between 24 inches and 36 inches and a width between 15 inches and 24 inches.

Clause 10. The device of any preceding clause, wherein the outer sleeve has a length of approximately 30 inches and a width of approximately 18 inches.

Clause 11. A device for positioning a patient in a prone position on a medical bed or table, comprising:

an outer sleeve having a length greater than a width,
- a top surface comprising an absorbent material configured to absorb moisture from the patient when the patient is placed thereon,
- a bottom surface comprising a non-slip texture or material, and
- a cavity between the top surface and the bottom surface and extending between an opening at one end of the length of the outer sleeve and a closed end at an opposite end of the length of the outer sleeve, the cavity defined at least in part by an inner upper surface and an inner bottom surface; and an inner sleeve having a length greater than a width and removably disposed in the cavity through the opening, the inner sleeve having a sleeve length that is approximately equal to the length of the outer sleeve, the inner sleeve having an opening at one end of the sleeve length and a closed end at an opposite end of the sleeve length and defining a sleeve cavity therebetween, the sleeve cavity configured to receive both arms of a user therein such that at least a hand and a forearm of both arms are covered by the inner sleeve, the inner sleeve comprising a different material than a material of the outer sleeve and that facilitates removal of the inner sleeve from the cavity of the outer sleeve, wherein the device facilitates movement of a patient from a supine position to a prone position on the top surface while facilitating the user's removal of their arms from under the patient once in the prone position via the removal of the inner sleeve from the cavity of the outer sleeve, and wherein the non-slip texture or material of the bottom surface inhibits shifting of the device and patient thereon from a medical bed or table on which the patient is placed in the prone position.

Clause 12. The device of clause 11, wherein the top surface is part of an absorbent pad of the outer sleeve.

Clause 13. The device of any of clauses 11-12, wherein the inner upper surface and inner bottom surface are configured to contact when the inner sleeve is removed from the cavity.

Clause 14. The device of any of clauses 11-13, wherein the inner upper surface and inner bottom surface are configured to frictionally engage when the inner sleeve is removed from the cavity.

Clause 15. The device of any of clauses 11-14, wherein the inner upper surface and inner bottom surface of the cavity are configured to adhere to each other when the inner sleeve are removed from the cavity.

Clause 16. The device of any of clauses 11-15, wherein the top surface comprises a non-slip texture or material.

Clause 17. The device of clause 16, wherein the non-slip texture or material is chosen from a group consisting of: foam, an adhesive material, wax, a textured rubber and cotton.

Clause 18. The device of any of clauses 11-17, wherein the outer sleeve has a length between 24 inches and 36 inches and a width between 15 inches and 24 inches.

Clause 19. The device of any of clauses 11-18, wherein the outer sleeve has a length of approximately 30 inches and a width of approximately 18 inches.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as “can,” “could,” “might,” or “may,” unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase “at least one of X, Y, and Z,” unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms “approximately,” “about,” “generally,” and “substantially” as used herein represent a value, amount, or characteristic close to the stated value, amount, or characteristic that still performs a desired function or achieves a desired result. For example, the terms “approximately”, “about”, “generally,” and “substantially” may refer to an amount that is within less than 10% of, within less than 5% of, within less than 1% of, within less than 0.1% of, and within less than 0.01% of the stated amount. As another example, in certain embodiments, the terms “generally parallel” and “substantially parallel” refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A device for positioning a patient in a prone position on a medical bed or table, comprising:

an outer sleeve having a length greater than a width, a top surface comprising an absorbent material configured to absorb moisture from the patient when the patient is placed thereon, a bottom surface comprising a non-slip texture or material, and a cavity between the top surface and the bottom surface and extending from an opening at one end of the length of the outer sleeve, the cavity defined at least in part by an inner upper surface and an inner bottom surface; and an inner sleeve removably disposed in the cavity through the opening, the inner sleeve having a sleeve length that is approximately equal to the length of the outer sleeve, the inner sleeve having an opening at one end of the sleeve length and a closed end at an opposite end of the sleeve length and defining a sleeve cavity therebetween, the sleeve cavity configured to receive both arms of a user therein such that at least a hand and a forearm of both arms are covered by the inner sleeve, the inner sleeve comprising a different material than a material of the outer sleeve and that facilitates removal of the inner sleeve from the cavity of the outer sleeve, wherein the device facilitates movement of a patient from a supine position to a prone position on the top surface while facilitating the user’s removal of their arms from under the patient once in the prone position via the removal of the inner sleeve from the cavity of the outer sleeve, and wherein the non-slip texture or material of the bottom surface inhibits shifting of the device and patient thereon from a medical bed or table on which the patient is placed in the prone position.

2. The device of claim 1, wherein the top surface is part of an absorbent pad of the outer sleeve.

3. The device of claim 1, wherein the inner upper surface and inner bottom surface are configured to contact when the inner sleeve is removed from the cavity.

4. The device of claim 3, wherein the inner upper surface and inner bottom surface are configured to frictionally engage when the inner sleeve is removed from the cavity.

5. The device of claim 3, wherein the inner upper surface and inner bottom surface of the cavity are configured to adhere to each other when the inner sleeve are removed from the cavity.

6. The device of claim 1, wherein the top surface comprises a non-slip texture or material.

7. The device of claim 6, wherein the non-slip texture or material is chosen from a group consisting of: foam, an adhesive material, wax, a textured rubber and cotton.

8. The device of claim 1, wherein the opening of the inner sleeve is a single opening.

9. The device of claim 1, wherein the outer sleeve has a length between 24 inches and 36 inches and a width between 15 inches and 24 inches.

10. The device of claim 9, wherein the outer sleeve has a length of approximately 30 inches and a width of approximately 18 inches.

11. A device for positioning a patient in a prone position on a medical bed or table, comprising:

an outer sleeve having a length greater than a width, a top surface comprising an absorbent material configured to absorb moisture from the patient when the patient is placed thereon, a bottom surface comprising a non-slip texture or material, and a cavity between the top surface and the bottom surface and extending from an opening at one end of the length of the outer sleeve, the cavity defined by an inner upper surface and an inner bottom surface; and an inner sleeve having a length greater than a width and removably disposed in the cavity through the opening, the inner sleeve having an opening at one end of the sleeve length and a closed end at an opposite end of the sleeve length and defining a sleeve cavity therebetween, the sleeve cavity configured to receive both arms of a user therein such that at least a portion of both arms are covered by the inner sleeve, the inner sleeve comprising a different material than a material of the outer sleeve and that facilitates removal of the inner sleeve from the cavity of the outer sleeve, wherein the device facilitates movement of a patient from a supine position to a prone position on the top surface while facilitating the user's removal of their arms from under the patient once in the prone position via the removal of the inner sleeve from the cavity of the outer sleeve, and wherein the non-slip texture or material of the bottom surface inhibits shifting of the device and patient thereon from a medical bed or table on which the patient is placed in the prone position.

12. The device of claim 11, wherein the top surface is part of an absorbent pad of the outer sleeve.

13. The device of claim 11, wherein the inner upper surface and inner bottom surface are configured to contact when the inner sleeve is removed from the cavity.

14. The device of claim 13, wherein the inner upper surface and inner bottom surface are configured to frictionally engage when the inner sleeve is removed from the cavity.

15. The device of claim 13, wherein the inner upper surface and inner bottom surface of the cavity are configured to adhere to each other when the inner sleeve are removed from the cavity.

16. The device of claim 11, wherein the top surface comprises a non-slip texture or material.

17. The device of claim 16, wherein the non-slip texture or material is chosen from a group consisting of: foam, an adhesive material, wax, a textured rubber and cotton.

18. The device of claim 11, wherein the outer sleeve has a length between 24 inches and 36 inches and a width between 15 inches and 24 inches.

19. The device of claim 18, wherein the outer sleeve has a length of approximately 30 inches and a width of approximately 18 inches.

* * * * *